United States Patent [19]

Yuchi

[11] Patent Number: 4,577,800

[45] Date of Patent: Mar. 25, 1986

[54] AIR CONDITIONING DEVICE FOR A VEHICLE

[75] Inventor: Kazuhide Yuchi, Shizuoka, Japan

[73] Assignee: Mitsubishi Denki Kabushiki Kaisha, Tokyo, Japan

[21] Appl. No.: 701,812

[22] Filed: Feb. 19, 1985

Related U.S. Application Data

[63] Continuation of Ser. No. 523,581, Aug. 16, 1983, abandoned.

[30] Foreign Application Priority Data

Aug. 19, 1982 [JP] Japan .................................. 57-143805

[51] Int. Cl.⁴ .......................................... G05D 23/00
[52] U.S. Cl. .................................... 237/2 A; 236/91 F; 165/39; 165/41

[58] Field of Search ............ 237/2 A, 12.3 A, 12.3 B; 236/13, 91 F; 165/39, 41

[56] References Cited

U.S. PATENT DOCUMENTS 3,934,642  1/1976  Coulson .................................. 165/41
4,417,688  11/1983  Schnaibel ............................. 237/2 A

FOREIGN PATENT DOCUMENTS 2019616  10/1979  United Kingdom .............. 236/91 F Primary Examiner—Henry Bennett
Attorney, Agent, or Firm—Oblon, Fisher, Spivak, McClelland & Maier

[57] ABSTRACT

An air conditioning device for a vehicle controls temperature of a vehicle cabin by ON-OFF control of a hot water valve provided in a pipe connected between a hot water coil and the engine of the vehicle.

4 Claims, 5 Drawing Figures

AIR CONDITIONING DEVICE FOR A VEHICLE

This application is a continuation of application Ser. No. 523,581 filed Aug. 16, 1983, now abandoned.

BACKGROUND OF THE INVENTION

1. Field of the Invention

The present invention relates to an air conditioning device for a vehicle for controlling temperature of a vehicle cabin at the time of heating by ON-OFF control of a hot water valve. More particularly, it relates to a heating unit of the air conditioning device for a vehicle which provides a comfortable air conditioning by keeping temperature of air diffused around a passenger's feet at more than a predetermined level.

2. Description of the Prior Art

In a heating unit for a vehicle, generally, control of temperature in a vehicle cabin has been performed by operating a hot water valve for controlling a flow rate of hot water, obtained by utilizing cooling water for cooling an engine, which passes through a coiled pipe for hot water, and an air-mix damper for controlling a volume of air passing through the space in the coiled pipe as described, for instance, in U.S. Pat. No. 4,356,705. However, the operations described above have hindered a precise temperature control of the vehicle cabin for the reason that positions of the valve and the damper to obtain a comfortable temperature condition vary dependent on changes in the weather and the load required to heat the interior of a vehicle where one of more passengers get on, with the result that it is difficult to keep the vehicle cabin at a uniform comfortable temperature. For this, the passengers having an uncomfortable feeling have been obliged to adjust the positions of the valve and the damper to control temperature in the vehicle cabin.

SUMMARY OF THE INVENTION

A primary object of the present invention is to provide an air conditioning device for a vehicle for keeping always a vehicle cabin at a comfortable temperature by a precise temperature control of a vehicle cabin so as to overcome the disadvantage of the conventional air conditioning device.

Another object of the present invention is to provide an air conditioning device for a vehicle which comprises in addition to a temperature sensor for controlling temperature of the cabin of the vehicle, a separate temperature sensor for detecting temperature of air blown from a foot-spot diffuser to control a hot water valve so as not to decrease the temperature of a hot air blown from the foot-spot diffuser to less than a predetermined level thereby avoiding blowing of a cool air.

Still another object of the present invention is to provide an air conditioning device for a vehicle which keeps always a vehicle cabin at a comfortable temperature even with an extremely simple structure by providing an electromagnetically operated hot water valve in a pipe connecting an engine to a coiled pipe for hot water.

DETAILED DESCRIPTION OF THE PREFERRED EMBODIMENT

An embodiment of the air conditioning device of the present invention will be described.

Figure 1:
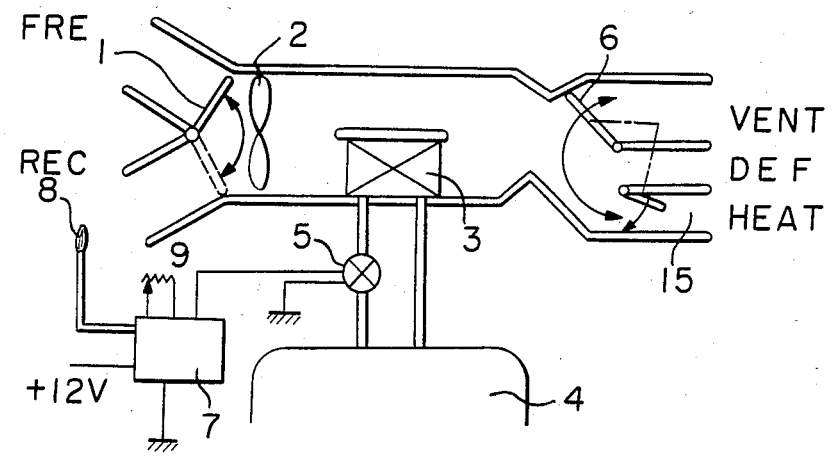
FIG. 1 is a schematic diagram showing an embodiment of an air conditioning device for a vehicle.
Figure 2:
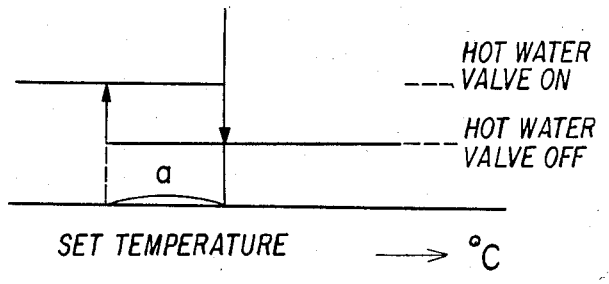
FIG. 2 is a diagram showing a control performance of the air conditioning device in FIG. 1.

FIGS. 1 and 2 show an air conditioning device for a vehicle on which the present invention is based.

For the purpose of attaining excellent controlling and comfortable feeling properties in a heating operation, it is generally considered to use a temperature controlling system through an ON-OFF control of a hot water valve as shown in FIG. 2.

Turning to FIG. 1, the reference numeral 1 designates an internal/external air change-over damper for selecting external air FRE or internal air REC; the numeral 2 designates a blower for feeding air into a vehicle cabin; the numeral 3 designates a hot water coil for heating the vehicle cabin, through which cooling water from an engine is passed; the numeral 4 designates the engine of the vehicle, the numeral 5 designates an electromagnetically operated hot water valve for controlling the flow of the hot water from the engine 4 to the hot water coil 3 by ON-OFF operations; the numeral 6 designates a diffuser change-over damper which selectively changes operation of a main diffuser VENT, a front glass diffuser DEF or a foot-spot diffuser HEAT to feed air into the vehicle cabin; the numeral 7 designates a controlling unit for the hot water valve which comprises a temperature sensor 8 formed of, for instance, a thermistor having a positive characteristic, to detect temperature of the vehicle cabin and a reference temperature setting element 9 for vehicle cabin and which performs ON-OFF control of the hot water valve with a controlling characteristic having a hysteresis width a as shown in FIG. 2.

With the heating unit for a vehicle having the construction described above, the temperature of the vehicle cabin can be always kept in the vicinity of a reference temperature by ON-OFF controlling of the hot water valve so that further improvement in controlling and comfortable feeling properties can be obtained in comparison with the conventional device.

In the above mentioned air conditioning device constructed in such a manner that external air is introduced from FRE side at the time of heating operation to feed hot air around a passenger's feet so as to carry out a temperature control, there has sometimes experienced that when an outdoor temperature is low such as less than 0° C., temperature reduction of air to be fed around the passenger's feet is severe during OFF time of the hot water valve 5 whereby the passenger may feel coolness around his feet.

In view of such inconvenience, an additional temperature sensor is provided near the foot-spot diffuser to keep the temperature of air fed around a passenger's feet at a predetermined range.

Another embodiment of the present invention will be described in detail with reference to FIGS. 3 and 4.

Figure 3:
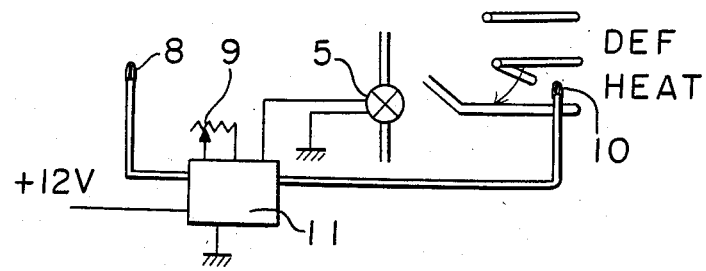
FIG. 3 is a schematic diagram of an embodiment of an important part of the air conditioning device according to the present invention.
Figure 4:
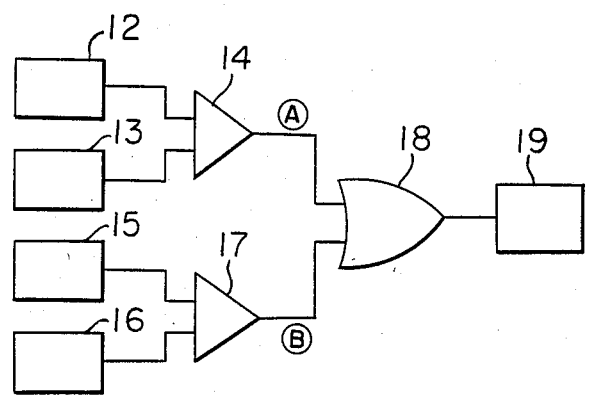
FIG. 4 is a block diagram showing a controlling system of the present invention.

FIG. 3 shows an important part of the air conditioning device of the present invention in which there is provided near a foot-spot diffuser 15 an additional temperature sensor 10 such as, for example, a thermistor having a positive characteristic, which is connected to a controlling unit 11 and FIG. 4 is a block diagram showing a controlling system of the present invention. In FIG. 4, the reference numeral 12 designates a vehicle cabin temperature detecting device including the temperature sensor 8; the numeral 13 designates a reference temperature setting device for the vehicle cabin including the reference temperature setting element 9; the numeral 14 designates a comparator; the numeral 15 designates a foot-spot air temperature detecting device including the temperature sensor 10; the numeral 16 designates a reference temperature setting device for foot-spot region; the numeral 17 designates a comparator; the numeral 18 designates an OR circuit; and the numeral 19 designates a driving circuit for the hot water valve 5.

Figure 5:
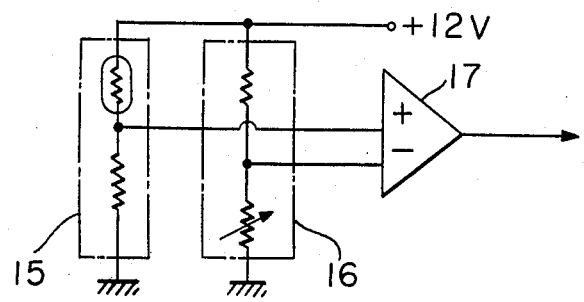
FIG. 5 is a circuit diagram of an embodiment of a signal producing device which detects and compares a reference temperature and an actual temperature around passenger's feet to provide a signal.

FIG. 5 is a circuit diagram of a signal producing device for controlling temperature of air around a passenger's feet. The reference temperature is normally set at about 30° C. which does not give coolness to a passenger, wherein input terminals of the comparator 17 are respectively connected to the foot-spot air temperature detecting device 15 and the reference temperature setting device for foot-spot region. Each detected voltage from these devices is input to the comparator 17 to compare the signals for controlling the hot water valve.

In the controlling system thus constructed, the comparator 14 compares the reference temperature of the vehicle cabin with an actual temperature of the vehicle cabin to generate a signal for rendering the hot water valve to be ON to the output terminal (A) according to the characteristic as shown in FIG. 2. On the other hand, the comparator 17 compares the reference temperature set at a predetermined level for the passenger's feet region with an actual temperature detected by the temperature sensor 10 placed near the passenger's feet region to generate a signal rendering the hot water valve to be ON to the output terminal (B) according to the characteristic similar to that in FIG. 2. When the ON signal for the hot water valve appears at either the output terminal (A) or (B), the hot water valve is opened by the hot water valve driving circuit 19 through the OR circuit 18.

In the air conditioning device having the controlling unit in accordance with the present invention, the temperature of a vehicle cabin can be kept in a predetermined range by controlling the temperature of air blown around a passenger's feet, without giving to the passenger coolness during OFF time of the hot water valve 5. The device of the present invention provides great merits of comfortableness and controllable property.

Furthermore, the temperature of the vehicle cabin can be kept in a predetermined range regardless of variation of the flow rate (a high or low notch operation) of air from the blower 2 because the hot water valve is controlled by the result of temperature detection through the first and second temperature sensors 8, 10.

I claim:

1. An air conditioning device for a vehicle adapted to feed a cooling liquid for cooling an engine to a hot water coil provided in a vehicle cabin and to control temperature of the vehicle cabin which comprises:

(a) a blower means which sucks at least internal air in said vehicle from an intake port and flows out from a foot-spot diffuser provided in said vehicle cabin a hot air which is heated during its passing through a hot water coil for heating placed in an air passage;
(b) an ON-OFF interruption means for interrupting intermittently flow of the cooling liquid fed into said hot water coil for heating;
(c) a first temperature sensor for detecting temperature of air in said vehicle cabin to be air-conditioned;
(d) a second temperature sensor for detecting temperature of air blown from said foot-spot diffuser;
(e) a reference temperature setting means for a cabin which allows manually setting of temperature for air-conditioning said vehicle cabin;
(f) a reference temperature setting means for a passenger's feet region which allows predetermination of temperature of air blown from said foot-spot diffuser; and
(g) a controlling unit comprising a first comparator for comparing a signal from said first temperature sensor with a set signal from said reference temperature setting means for a cabin, a second comparator for comparing a signal from said second temperature sensor with a set signal from said reference temperature setting means for a passenger's feet region and a driving circuit for driving said ON-OFF interruption means by receiving output from said first and/or second comparator, whereby said vehicle cabin is air-conditioned and said ON-OFF interruption means is controlled to keep the temperature of air blown from said foot-spot diffuser to be maintained at a predetermined minimum temperature regardless of the result of the comparison of said first comparator so as to keep the feet of the passengers comfortable.

2. An air conditioning device for a vehicle adapted to feed a cooling liquid for cooling an engine to a hot water coil provided in a vehicle cabin and to control temperature of the vehicle cabin which comprises:

(a) a blower means which sucks at least internal air in said vehicle from an intake port and flows out from a foot-spot diffuser provided in said vehicle cabin a hot air which is heated during its passing through a hot water coil for heating placed in an air passage;
(b) an ON-OFF interruption means for interrupting intermittently flow of the cooling liquid fed into said hot water coil for heating;
(c) a first temperature sensor for detecting temperature of air in said vehicle cabin to be air-conditioned;
(d) a second temperature sensor for detecting temperature of air blown from said foot-spot diffuser;
(e) a reference temperature setting means for a cabin which allows manually setting of temperature for air-conditioning said vehicle cabin;
(f) a reference temperature setting means for a passenger's feet region which allows predetermination of temperature of air blown from said foot-spot diffuser; and
(g) a controlling unit comprising a first comparator for comparing a signal from said first temperature sensor with a set signal from said reference temperature setting means for a cabin, a second comparator for comparing a signal from said second temperature sensor with a set signal from said reference temperature setting means for a passenger's feet region, an OR-gate which receives the outputs from said first and second comparators and produces an output when an input is received from one of the first and second comparators, and a driving circuit for driving said ON-OFF interruption means when an output from said OR-gate is received, whereby said vehicle cabin is air-conditioned and said ON-OFF interruption means is controlled to keep the temperature of air blown from said foot-spot diffuser to be in a predetermined range.

3. An air conditioning device according to claim 1 wherein said ON-OFF interruption means is an electromagnetically operated hot water valve which is provided in a pipe for connecting said enging and said hot water coil.

4. An air conditioning device according to claim 1 wherein said second temperature sensor is placed near said foot-spot diffuser.

* * * * *